US008640133B2

(12) United States Patent  
El-Shishiny et al.

(10) Patent No.: US 8,640,133 B2  
(45) Date of Patent: Jan. 28, 2014

(54) EQUAL DURATION AND EQUAL FETCH OPERATIONS SUB-CONTEXT SWITCH INTERVAL BASED FETCH OPERATION SCHEDULING UTILIZING FETCH ERROR RATE BASED LOGIC FOR SWITCHING BETWEEN PLURALITY OF SORTING ALGORITHMS

(75) Inventors: Hisham El-Shishiny, Gizi (EG); Ali El-Moursy, Gizi (EG)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 12/641,514

(22) Filed: Dec. 18, 2009

(65) Prior Publication Data

US 2010/0162041 A1   Jun. 24, 2010

(30) Foreign Application Priority Data

Dec. 19, 2008   (EP) .................................... 08172360

(51) Int. Cl.  
*G06F 9/46* (2006.01)  
*G06F 9/445* (2006.01)  
*G06F 9/30* (2006.01)

(52) U.S. Cl.  
USPC ............ 718/102; 712/220; 712/207; 718/103

(58) Field of Classification Search  
USPC ....................................................... 718/102  
See application file for complete search history.

(56) References Cited

U.S. PATENT DOCUMENTS

| 6,658,447 | B2 | 12/2003 | Cota-Robles |
| 6,898,694 | B2 * | 5/2005 | Kottapalli et al. ............ 712/207 |
| 7,165,252 | B1 * | 1/2007 | Xu ................................. 718/102 |
| 7,493,452 | B2 | 2/2009 | Eichenberger et al. |
| 7,631,308 | B2 | 12/2009 | Bishop et al. |
| 7,707,391 | B2 | 4/2010 | Musoll et al. |
| 7,802,236 | B2 | 9/2010 | Calder et al. |
| 7,831,970 | B2 * | 11/2010 | Moore .......................... 718/102 |
| 8,255,631 | B2 * | 8/2012 | Chen et al. .................... 711/137 |

(Continued)

FOREIGN PATENT DOCUMENTS

| WO | WO9921089 A1 | 4/1999 |
| WO | WO0036487 A2 | 6/2000 |
| WO | WO0267116 A2 | 8/2002 |

OTHER PUBLICATIONS

Snavely et al., "Symbiotic Jobscheduling with Priorities for a Simultaneous Multithreading Processor," Sigmetric, vol. 35, Issue 11, Jun. 2002, pp. 234-244.

*Primary Examiner* — Kenneth Tang  
*Assistant Examiner* — Kevin X Lu  
(74) *Attorney, Agent, or Firm* — Yee & Associates, P.C.; David A. Mims, Jr.

(57) ABSTRACT

Fetch operations are assigned to different threads in a multi-threaded environment. There are provided a number of different sorting algorithms, from which one is periodically selected on the basis of whether the present algorithm is giving satisfactory results or not. The period is preferably a sub-context interval. The different sorting algorithms preferably include a software/OS priority. A second sorting algorithm may include sorting according to hardware performance measurements. Two-level priority scheme is used to combine both priorities. The judgement of satisfactory performance is preferably based on the difference between a desired number of fetch operations attributed per sub-context switch interval to each thread and a real number of fetch operations attributed per sub-context switch interval to each thread.

15 Claims, 8 Drawing Sheets

(56) References Cited

U.S. PATENT DOCUMENTS

| | | | |
|---|---|---|---|
| 8,271,741 B2 | 9/2012 | Mutlu et al. | |
| 8,356,304 B2* | 1/2013 | El-Moursy et al. | 718/102 |
| 2002/0129048 A1* | 9/2002 | Qiu et al. | 707/204 |
| 2004/0111708 A1* | 6/2004 | Calder et al. | 717/131 |
| 2007/0143580 A1* | 6/2007 | Musoll et al. | 712/205 |
| 2008/0046657 A1* | 2/2008 | Eichenberger et al. | 711/137 |
| 2009/0138880 A1* | 5/2009 | Yafimau | 718/103 |
| 2009/0216962 A1* | 8/2009 | Mutlu et al. | 711/151 |
| 2009/0235262 A1* | 9/2009 | Ceze et al. | 718/102 |

* cited by examiner

EQUAL DURATION AND EQUAL FETCH OPERATIONS SUB-CONTEXT SWITCH INTERVAL BASED FETCH OPERATION SCHEDULING UTILIZING FETCH ERROR RATE BASED LOGIC FOR SWITCHING BETWEEN PLURALITY OF SORTING ALGORITHMS

FIELD OF THE INVENTION

The present invention relates to the scheduling of fetch operations to different threads in a multithreaded environment.

BACKGROUND OF THE INVENTION

In the last decade microarchitecture design innovations such as speculation and out-of-order superscalar execution have dramatically improved microprocessor efficiency and brought substantial performance gains. One such innovation is Simultaneous Multithreading (SMT) which allows multiple threads to share core resources concurrently. In SMT processors, multiple threads share the fetch bandwidth of the machine either on a cycle by cycle basis or even aggressively on a single cycle basis according to the SMT implementation. In order to efficiently share the machine resources, fetch units need to be carefully designed. The fetch mechanism directly affects the quality of instructions fed to the machine pipeline and accordingly the flow of instructions executed. A naive fetch mechanism will result in inefficient resource allocation, poorly utilized machine resources, and as a result, sub-optimal machine throughput. The dominant factor in all of the fetch mechanisms proposed is to schedule the best candidate applications for fetching on a cycle by cycle basis. The assumption in most fetch policies proposed in the literature is that the running applications have equal priorities. In reality, applications running concurrently are not equally important and even some of them, such as real time applications, may require hard deadlines to finish their tasks. OS designers have given users many levels of priorities for their applications to define the importance of the running jobs. In single thread processors, achieving the job/application priorities is very simple and is achievable by simple time quantum sharing of the microprocessor. On the other hand achieving the same goal in SMT machines is significantly more challenging, given the fine grain sharing of the machine resources. One known solution to this problem is the approach taken in the article by Allan Snavely, Dean M. Tullsen, Geoff Voelker entitled Symbiotic Jobscheduling with Priorities for a Simultaneous Multithreading Processor. Sigmetrics 2002 [Allan02] in which SMT processors could run in either single threaded or multithreaded (SMT) mode. The time quantum for each application, defined by its priority, is divided into two parts—one for the application to run with others in SMT mode and the second for the application to run alone to achieve its time quantum.

Another solution to the thread priority problem in SMT processors is the one proposed in U.S. Pat. No. 6,658,447 B2 Priority Based Simultaneous Multi-Threading. [Erik03]. In this disclosure, the inventor scales the thread hardware execution heuristics based on each application Operating System (OS) priority.

The inventors in US Patent 2006/0184946 Thread Priority Method, Apparatus, and Computer Program Product for Ensuring Processing Fairness in Simultaneous Multi-Threading Microprocessors [James06] have implemented a method to strictly achieve the OS thread priority for two threads on a cycle by cycle basis.

WO02067116A2 describes a method for controlling thread priority on a multithreaded processor using one level thread priority mechanism.

WO00036487A2 describes one-level priority scheme for instruction scheduling. WO09921089A1 describes a method to switch between threads in a multi-threaded processor.

SUMMARY OF THE INVENTION

According to the present invention there is provided a method scheduling fetch operations according to the appended independent claim 1, and a computer program, a computer readable medium and a system according to appended claims 7 to 9 respectively. Preferred embodiments are defined in the appended dependent claims.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

DETAILED DESCRIPTION

Figure 1:
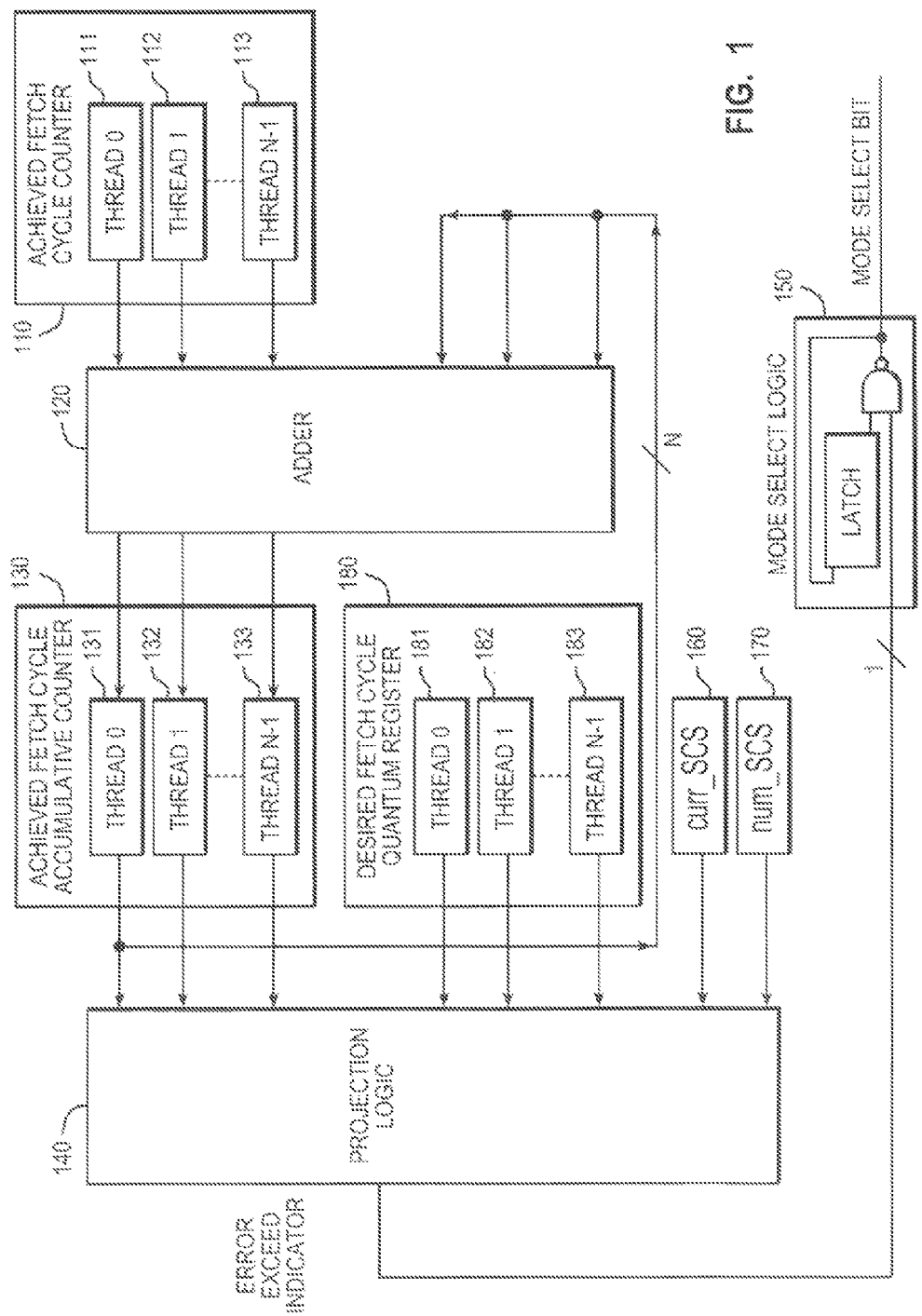
FIG. 1 shows schematically certain functional elements used to implement the projection and processor mode switching according to one embodiment.

Analysis of the available prior art solutions has revealed deficiencies that are addressed by embodiments of the present invention. In [Allan02] the time quantum for each application, defined by its priority, is divided into two parts—one for the application to run with others in SMT mode and the second for the application to run alone to achieve its time quantum. There are two drawbacks to using this method. First, running an application in a single thread mode on an SMT machine for a full context switch period may result in a significant waste of SMT machine resources that could be utilized by other threads/applications. Second, the mechanism described to reduce the waste in machine resource relies on SOS (Sample, Optimize, Symbios) job scheduling which has scaling limitations. In [Erik03] the inventor scales the thread hardware execution heuristics based on each application Operating System (OS) priority. The success of the technique is highly dependent on the success in finding the appropriate scaling function as well as the simplicity of that function to be implemented in hardware to get cycle by cycle feedback information which is not guaranteed. Another drawback is that scaling may completely invert the hardware priority in favour of OS priority or vice versa. It could be argued that dynamic change of the scaling functions could compensate for that effect but this will make it even harder to be implemented and run on a cycle by cycle basis. Also there is no guarantee that the high priority threads will actually achieve their assigned time quanta for hard deadline applications. In [James06] there is disclosed a method to strictly achieve the OS thread priority for two threads on a cycle by cycle basis without any consideration to the SMT machine performance or throughput. The measure of success for a thread scheduling to fetch instructions should take into account not only the machine throughput but also should avoid thread starvation.

Embodiments relate generally to providing a number of different sorting algorithms, from which one is periodically selected on the basis of whether the present algorithm is giving satisfactory results or not. The period is preferably a sub-context interval as described hereafter. The different sorting algorithms preferably include a software/OS priority as discussed above. A second sorting algorithm may include sorting according to hardware performance measurements. The judgement of satisfactory performance is preferably based on the difference between a desired number of fetch operations attributed per sub-context switch interval to each thread and a real number of fetch operations attributed per sub-context switch interval to each thread.

According to a preferred embodiment there are provided a number of scheduling fetch operations to (N) different threads in a multithreaded environment wherein a first predetermined number (M) of fetch operations may be carried out in a given cycle. The expression "Context Switch Interval" is a well known term in the computer art, representing a period during which a group of applications or threads are scheduled to run on the computer processors for example by the Operating System. The "Sub-Context Switch Interval" as described in more detail hereafter represents a division of the "Context Switch Interval" into preferably even portions. According to this preferred embodiment, a software/OS priority is determined for each thread, and a desired number of fetch operations per sub-context switch interval is attributed to each said thread on the basis of this software/OS priority (Desired_Fetch_Quantum). Still further according to this preferred embodiment, each sub-context switch interval, each of said first predetermined number (M) of fetch operations is attributed to one or more of said threads on the basis of a either a first sorting algorithm or a second sorting algorithm, wherein said first sorting algorithm or priority type comprises sorting said threads according to their software/OS priorities, and wherein said first sorting algorithm is a default mode. An error value is determined based on the difference between said desired number of fetch operations per sub-context switch interval and the number of fetch operations attributed per sub-context switch interval to each said thread, and in a case where said error value exceeds a predetermined value, switching to whichever of said two sorting algorithms is not presently selected for following sub-context switch intervals.

Preferably the error value is determined by determining an average number of fetch operations attributed per sub-context switch interval to each said thread, and for each thread a difference between this desired number of fetch operations per sub-context switch interval and the average number of fetch operations attributed per sub-context switch interval to each said thread is determined. The difference values for all threads are combined to arrive at an error value, which may then be normalised as required.

According to one embodiment, two level schedule tables may be used to implement these steps. Primary and secondary scheduling tables select candidate thread/s to consume the fetch bandwidth each cycle. Threads are selected from the primary schedule table then filtered/re-ordered by the secondary schedule table to get the final set of threads. Each of those scheduling tables is populated based on one priority type. Possible priority types may be hardware throughput/system performance, that is to say, prioritising in such a way as to achieve maximum processor use, and Software/OS priority.

Selection of which priority list to populate, either the primary or secondary scheduling lists, is done periodically, for example every sub-context switch interval.

Scheduling list selection is adaptively performed based on a projection mechanism to compare what is achieved so far in the last j scheduling periods to reach the target system, sharing among the running threads.

Certain advantages of the present invention include allowing for full flexibility in using the system hardware with the best performance possible and satisfying the software/OS priority needs.

According to certain embodiments there may be defined two logical phases:
 a. Projection and mode selection
 b. Thread selection and scheduling for fetch Each of these two phases is discussed in turn in more detail hereafter.

A. Projection & Mode Selection:

Thread software/OS priority is directly mapped to a number of cycles during which the thread should take the opportunity to use a fetch. Each thread that is given an opportunity for fetch in a given cycle will consume it so it will be counted toward its system share or consumed opportunity for fetch operations. Software/OS priority is satisfied if each thread consumes exactly the number of fetch operations assigned to it according to its priority level. An N-Way SMT processor is a processor that could run (N) threads (Hardware contexts or logical processor) simultaneously, such that the OS could schedule N threads on that processor for a given context switch interval. Context Switch Interval (CS_intrv) is defined as the number of cycles during which N Software threads are concurrently sharing the processor through N Hardware contexts or logical processor. The Context switch interval is divided evenly into sub-intervals—these intervals are called sub-context switch intervals. Sub-Context Switch Interval (SCS_intrv) is defined as the number of cycles per sub-context switch interval. In a context switch interval we have number of sub-context switch intervals to be called (N_SCS) where N_SCS is calculated as Context Switch Interval (CS_intrv)/Sub-Context Switch Interval (SCS_intrv) (Sub-Context Switch Interval (SCS_intrv) should be multiple integer of Context Switch Interval (CS_intrv)). Two modes of operation are defined for the processor. One we call hardware/throughput mode (perf_mode). The other may be called Software/OS mode (os_mode). For a given Sub-Context Switch Interval (SCS_intrv), the processor is to be in just one mode and no change in the mode occurs until the present Sub-Context Switch Interval (SCS_intrv) is completed. The processor mode may be switched from one mode to the other according to the outcome of the projection logic described below.

FIG. 1 shows schematically certain functional elements used to implement the projection and processor mode switching according to one embodiment. Each mode and its effect on the thread opportunity for fetching in the thread selection and scheduling section is described in more detail hereafter. As shown in FIG. 1, there is provided:

Achieved Fetch cycle counter 110: A counter per thread that counts the number of times thread participates in consuming fetch bandwidth during Sub-Context Switch Interval (SCS_intrv). As shown the Achieved Fetch cycle counter 110 comprises a counter for each respective thread 0 to N−1, 111, 112 and 113.

Achieved Fetch cycle Accumulative counter 130: A counter per thread that cumulatively counts the times each thread participates in consuming fetch bandwidth during Context Switch Interval (CS_intrv). As shown the Achieved Fetch cycle Accumulative counter 130 comprises a counter for each respective thread 0 to N−1, 131, 132 and 133.

Desired Fetch cycle Quantum register 180: A register per thread that is initialized with the Desired Fetch Quantum as explained below. As shown the Desired Fetch cycle Quantum register 180 comprises a counter for each respective thread 0 to N−1, 181, 182 and 183.

Curr_SCS 160: a counter for the number of Sub-Context Switch Interval (SCS_intrv) since the beginning of the Context Switch Interval (CS_intrv).

Num_SCS 170: a register carries the value N_SCS.

j: is the value of Curr_SCS counter which is the number of Sub-Context Switch Interval (SCS_intrv) passed since the start of the current Context Switch Interval (CS_intrv)

i: is an index for the thread id for threads currently scheduled to run on the processor by OS so 0=i<N.

Projection Logic 140: A logic to perform the mathematical formula given by equation 1 to calculate the difference between current_error and error_limit at the end of each Sub-Context Switch Interval (SCS_intrv) j.

Current_error$_j$: is defined to be the normalized error computed as the Manhattan distance between the desired fetch quantum and the projected fetch quantum as shown in equation 1.

Error_limit: is a predefined threshold for the error (i.e. 0.05)

The output of the projection logic is a one bit indicator that indicates whether current_error exceeds error_limit or not Mode select logic 150: is a very simple logic gate to decide the mode for the next Sub-Context Switch Interval (SCS_intrv)

Desired Fetch Quantum$_i$: is the value of Desired Fetch cycle Quantum register for a given thread i. It is the number of fetch operations for each thread to be achieved during the whole Context Switch Interval (CS_intrv). The value of the Desired Fetch Quantum is defined according to the mapping between the thread Software/OS priority and number of fetch operations attributed to the thread. This mapping could be implemented using simple formula as the one shown in equation 2 or using a lookup table to map each priority level to a predefined number of fetch operations. One example of a formula to calculate F(Priority) is shown in equation 3.

M: is the number of fetch operations (Number of threads consume fetch bandwidth) per cycle Num_FCS: is the total number of fetch opportunities during the entire Context Switch Interval (CS_intrv), then Num_FCS=M*CS_intrv Priority$_i$: is the priority level of thread i. Priority levels could take values from zero to a predefined integer constant (i.e. 7). The higher the priority value the higher the priority level.

Projected Fetch Quantum$_{ij}$: is the projected number of fetch operations for thread i for Sub-Context Switch Interval (SCS_intrv) j at the end of the Context Switch Interval (CS_intrv) and is computed as shown in equation 4.

Achieved Fetch Accumulative$_{ij}$: is defined as the value of the Achieved Fetch cycle Accumulative counter for thread i at the Sub-Context Switch Interval (SCS_intrv) j To increase the projection accuracy projection logic does not effectively operate for a number of SCS intervals (j>L where L is a number of warm up SCS intervals)

$$\text{current\_error}_j = \frac{\sum_{i=0}^{N-1} \left| \text{Desired\_Fetch\_Quantum}_i - \text{Projected\_Fetch\_Quantum}_{ij} \right|}{\sum_{i=0}^{N-1} \text{Desired\_Fetch\_Quantum}_i} \quad \text{Equation 1}$$

$$\text{Desired\_Fetch\_Quantum} = \frac{\text{Num\_FCS} * F(\text{Priority}_i)}{\sum_{i=0}^{N-1} F(\text{Priority}_i)} \quad \text{Equation 2}$$

(for thread i)

$$F(\text{Priority}_i) = 2^{\text{priority}_i} \quad \text{Equation 3}$$

$$\text{Projected\_Fetch\_Quantum}_{ij} = \left( \frac{\text{Achieved\_Fetch\_Accumulative}_{ij} * \text{N\_SCS}}{j} \right) \quad \text{Equation 4}$$

Figure 2A:
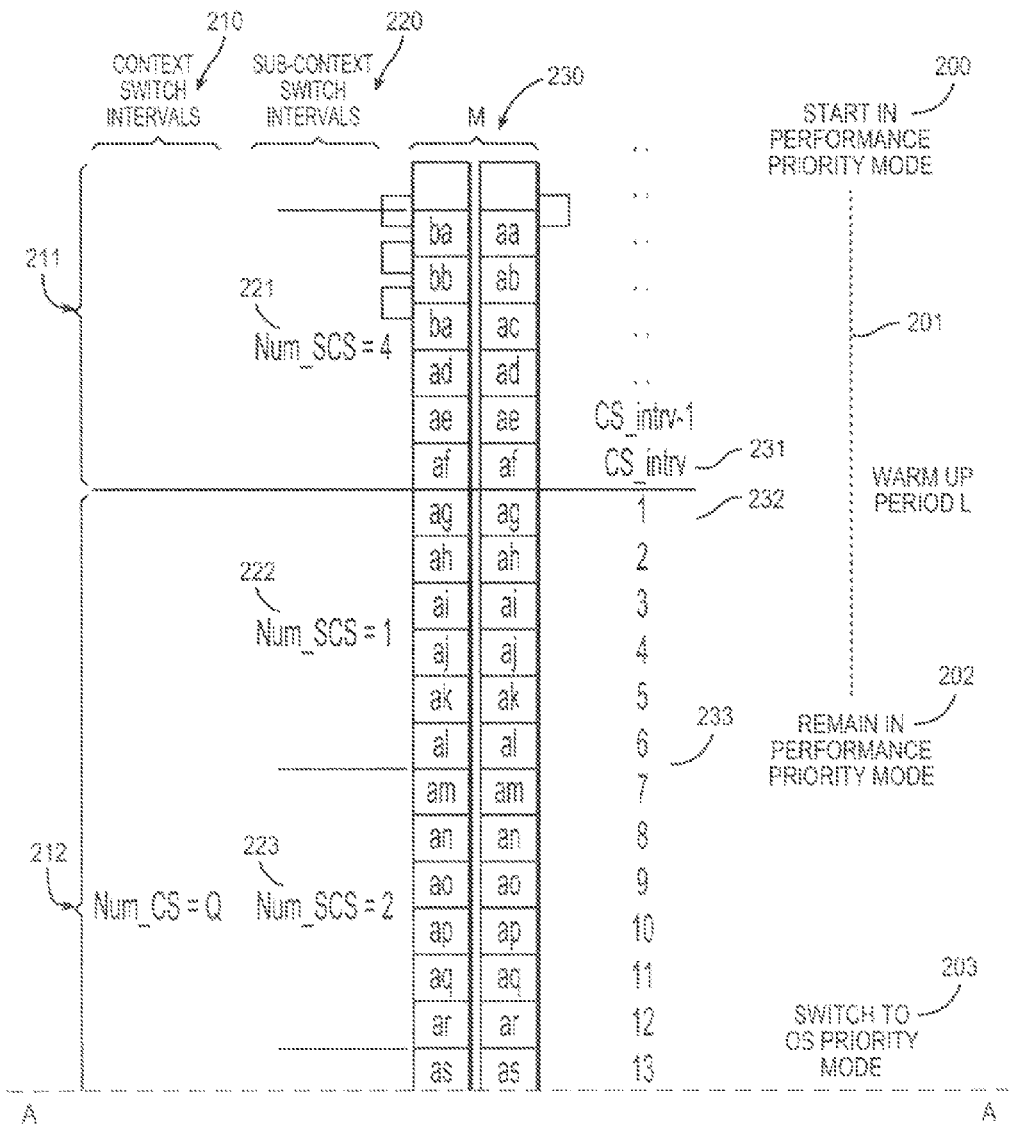
FIG. 2 schematically illustrates the relationship of context switch intervals, sub-context switch intervals, fetch operations and threads.
Figure 2B:
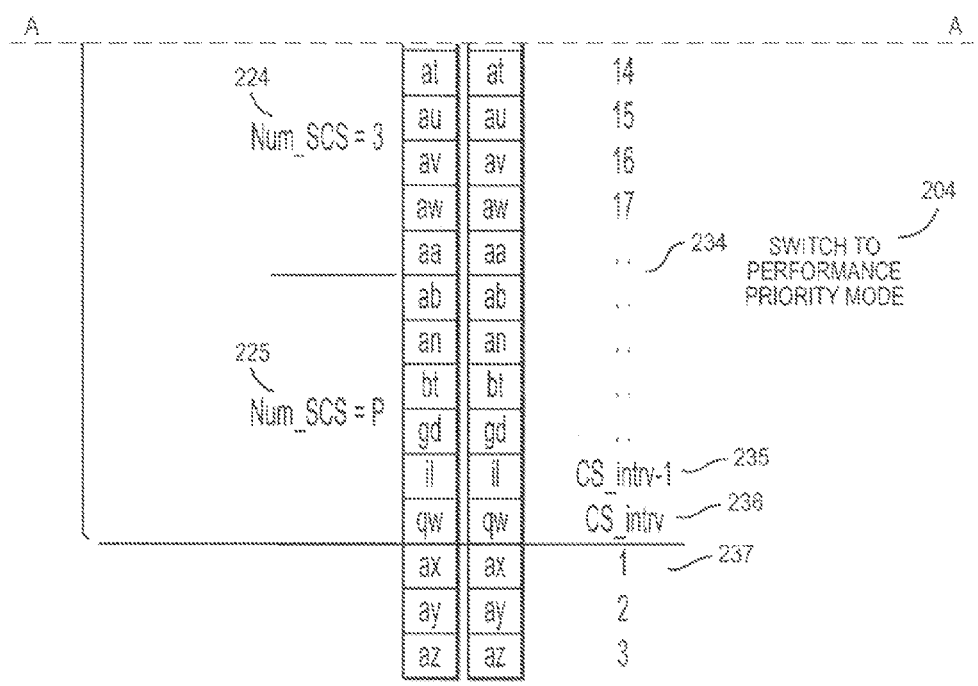

As described above, each context switch interval is divided into a plurality of sub-context switch intervals. Each sub-context switch interval comprises a predefined number of fetch operations, which is preferably the same for each sub-context switch interval, so that each cycle comprises M fetch operations, each fetch operation being attributed to one of N threads selected as described herein. FIG. 2 schematically illustrates the relationship of context switch intervals, sub-context switch intervals, fetch operations and threads. As shown in FIG. 2, a plurality of sequential context switch intervals 210, specifically 211 and 212 are each divided into a plurality of sub-context switch intervals. As shown, each context switch interval comprises four sub-context switch intervals 220, such as 222, 223, 224, 225 in the case of context switch interval 212. As shown in FIG. 2, each sub-context switch interval comprises six cycles. Each cycle comprises M fetch operations 230, such as 231, 232, 233, 234, 235, 236, 237, each fetch operation being attributed to one of N threads each identified in the present example by a two letter reference aa-zz, selected as described herein.

Thus for this example,
Num_FCS=M*CS_intrv
In this example: M=2 fetch operations per cycle,
SCS_intrv=6 cycles,
N_SCS=4
CS_intrv=24 cycles (N_SCS*SCS_intrv)
Num_FCS=48 fetch operations
Where there are a total of N threads running, of which M are selected each cycle As described hereafter, each of said M fetch operations are attributed to one of said threads on the basis of a either a first sorting algorithm or a second sorting algorithm, wherein said first sorting algorithm comprises sorting said threads according their software/OS priorities, and wherein said first sorting algorithm is a default mode. Each sub-context switch interval the average number of fetch operations attributed per sub-context switch interval to each said thread is calculated, and from this value a difference between a desired number of fetch operations per sub-context switch interval and the average number of fetch operations attributed per sub-context switch interval to each said thread can be determined. By combining the difference values for all threads an error value is arrived at and in a case where the error value exceeds a predetermined value, the sorting algorithm not presently in use is selected for the following sub-context switch interval. As shown in FIG. 2, a warm up period L, 201, expires at the end of the sub-context switch interval 222, during which period no change in sorting algorithm may take place, the sorting algorithm being fixed to the default "performance priority mode" as described herein. This as shown during this period thread aa, ab, ac, ad, ae, af, ag, ah, ai, aj, ak and al are attributed to the respective fetch operations in accordance with the default "performance priority mode". Nevertheless, the Error value is calculated during the warm up period L, and at the end of the period after fetch operation 233, the first determination whether the error value exceeds a predetermined value. As shown, it is determined that the error value does not exceed the predetermined value, and accordingly as per 202 the performance priority mode is retained. Execution continues for a further sub-context switch interval 223, during the "performance priority mode" as described herein continues to be used, attributing fetch operations to threads am, an, ao, ap, aq and ar. The Error value is calculated as usual, and at the end of the sub-context switch interval 223, a second determination whether the error value exceeds a predetermined value is made. As shown, this time it is determined that the error value exceeds the predetermined value, and accordingly as per 203 the sorting algorithm is switched to an alternative sorting algorithm. According to the present embodiment this alternative sorting algorithm is an OS priority mode as described herein.

This process described above is repeated continually, with the sorting algorithm being switched between the OS priority mode and performance priority mode whenever it is determined that the current sorting algorithm is resulting in a divergence from an acceptable error level. At the end of the fourth sub-context switch interval 225 of the context switch interval 212, the Num_FCSth fetch operation is executed before starting a new context switch interval with a new set of Num_FCS fetch operations.

Figure 3:
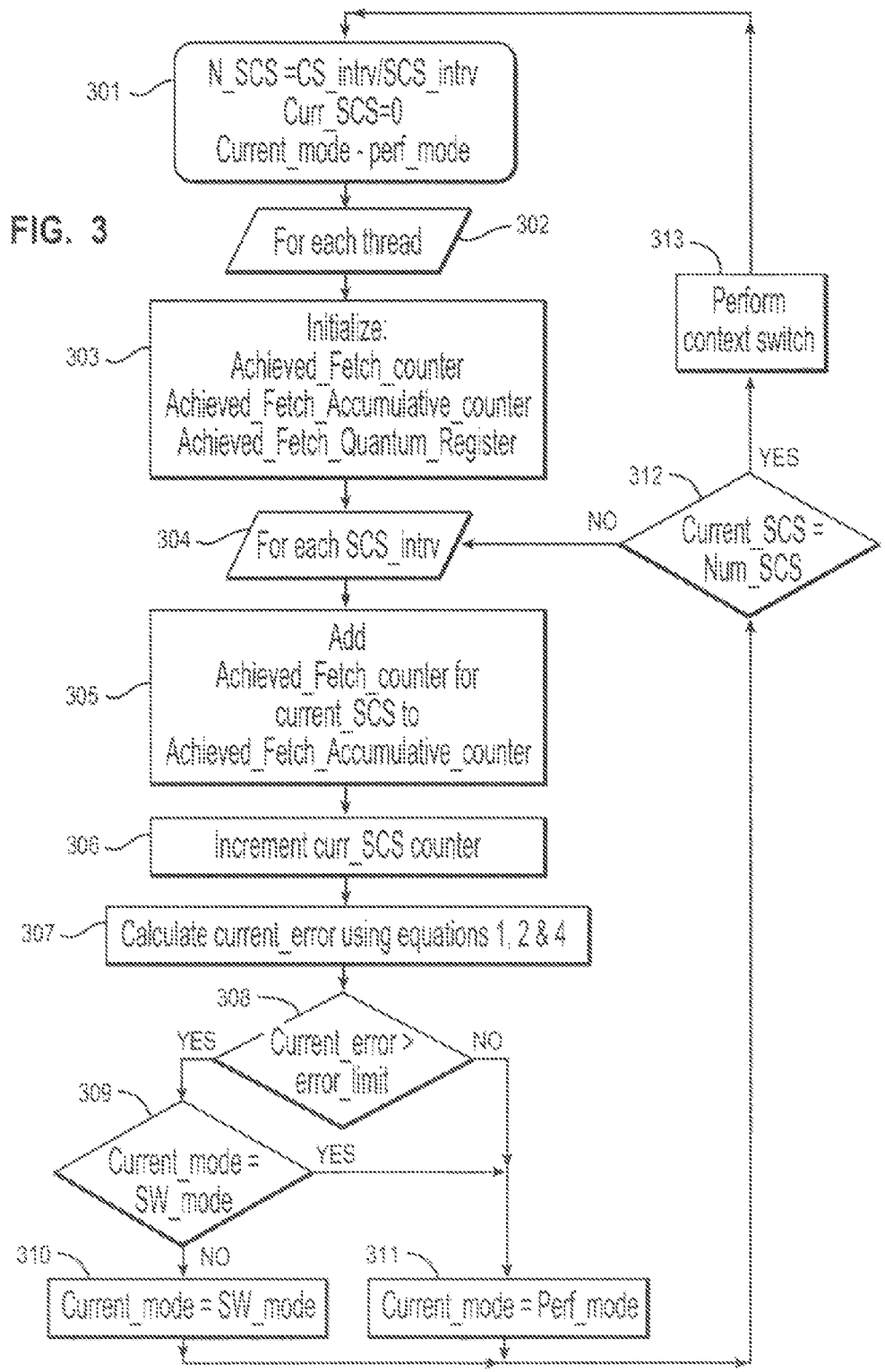
FIG. 3 shows a flowchart that illustrating the projection process according to certain embodiments.

FIG. 3 shows a flowchart that illustrating the projection process according to certain embodiments. At the start of the context switch interval (CS_intrv) the Operating System (OS) selects N threads from the actively running threads in the system for scheduling to run on the processor (where N is the total number of hardware threads the processor supports as we described before). In the first step 301, sub-context switch counter current_SCS is reset. The Context switch interval is divided evenly into a group of sub-context switch intervals, and then Num_SCS is populated. For the first SCS interval the processor mode is set to Perf_mode. Per step 302 for each thread at step 303 a desired fetch quantum is calculated and stored in a corresponding register and Achieved fetch counters are reset. Per step 304 for each Sub-Context Switch Interval (SCS_intrv) at step 305 the achieved fetch counter per thread per sub-context switch interval is maintained, at the end of the Sub-Context Switch Interval (SCS_intrv) the achieved fetch counter is cumulatively added to the achieved fetch cumulative counter. The curr_SCS counter is incremented at step 306. Projection logic is used to calculate current error at step 307 and compare it to the error_limit at step 308 once the warm-up period expires—current error is not calculated until current_SCS exceeds the warm-up value (L) as described before (Not shown in the flowchart). If current error is greater than the limit the mode is toggled from SW_mode to Perf_mode at step 311, or vice versa at step 310 if the current mode is already SW-Mode as determined at step 309. If the error is within the limit then we keep running in Perf_mode for the next Sub-Context Switch Interval (SCS_intrv). If Context Switch Interval (CS_intrv) is consumed as determined at step 312 the OS will swap out running threads and select others at step 313, or otherwise return to step 304. From step 313 the process returns to step 301. The process is then repeated from the beginning.

Figure 4:
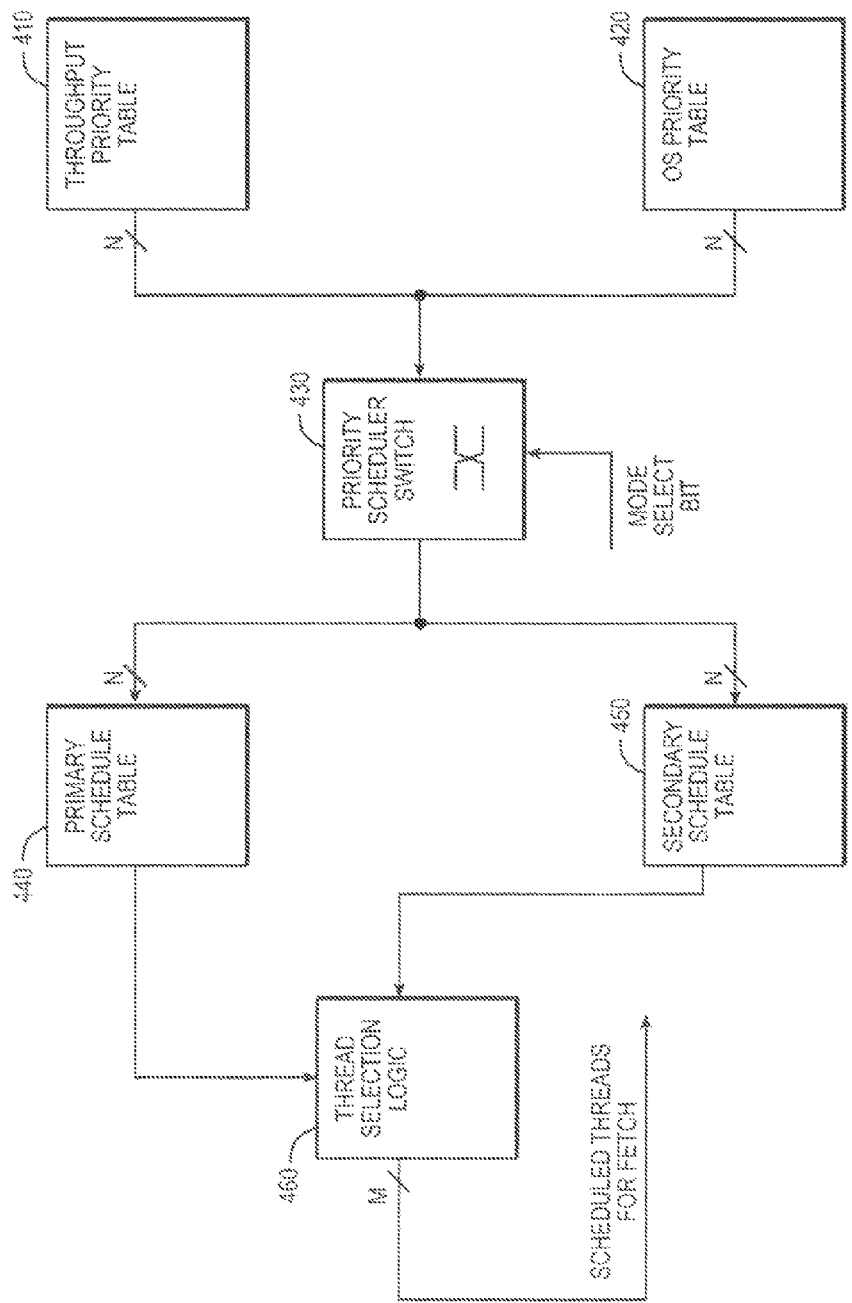
FIG. 4 shows the hardware used to perform the thread selection & scheduling process according to certain embodiments.

B. Thread Selection & Scheduling for Fetch:

Although the Fetch Unit is shared among all N threads only a subset (M) of the threads can utilize the fetch bandwidth for each cycle (for hardware limitation where M is 0<M<N). All M selected threads given the opportunity to fetch in a given cycle have a fair share of the fetch bandwidth. M selected threads from the N threads are dynamically changed each cycle FIG. 4 shows the hardware used to perform the thread selection & scheduling process according to certain embodiments. As described above, M threads are selected for fetch in each cycle using thread selection logic. Thread selection logic 460 uses the input from two scheduling tables 440, 450. A first scheduling table 440 is called primary while the other 450 is called the secondary scheduling table. In each of the two scheduling tables the N threads are sorted differently according to respective priority criteria or sorting algorithms. We define two sorting algorithms. A first sorting algorithm is hardware/throughput priority (perf_prio) in which threads are sorted according to their efficiency of utilizing hardware resources. A second sorting algorithm may be software/OS priority (os_prio) in which, threads are sorted according to their software/OS priorities.

A throughput priority table 410 is used to prioritize threads according to the hardware/throughput priority sorting algorithm, and OS priority table 420 is used to prioritize threads according to the OS priority sorting algorithm. The throughput priority table 410 and OS priority table 420 also include information about stalled threads, which are prevented from fetching any instruction in the given cycle until the stall is resolved. In each of the throughput priority table 410 and the OS priority table 420 Thread order in the list indicates the thread priority. The higher the thread's order the higher the thread priority.

Population of the throughput priority table 410 is performed using hardware performance counters, details of which are beyond the scope of this disclosure. The skilled person will be familiar with various such counters that can be used to measure the efficiency for each thread of using the machine resources. Some example of such counters (per thread) are: Number of cache misses, number branches, number of ready instructions in the machine pipeline, . . . etc. According to one common technique one counts the number of instruction in the machine pipeline for each thread. The fetch policy associated to this type of counters called ICOUNT fetch policy in SMT processors proposed in the paper: D. Tullsen, S. Eggers, J. Emer, H. Levy, J. Lo, and R. Stamm. Exploiting choice: Instruction fetch and issue on an implementable simultaneous multithreading processor. In 23rd Annual International Symposium on Computer Architecture, May 1996.

Achieved Fetch cycle Accumulative counters are used to populate the software/OS priority table. Selection of which priority table should populate which scheduling table is done using a priority scheduler switch 430 based on the mode selected in the projection as described above. Thread selection logic 460 may be implemented in a variety of ways. In accordance with one embodiment, the highest priority "M" threads from the primary table 440 are selected, and the secondary table 450 is used only in case of tie, i.e. where two threads have the same priority levels in the primary table. In accordance with another embodiment, the primary schedule table 440 is used to only filter threads that are not currently stalled and pass them to the secondary table 450 to prioritize.

As mentioned above, the default selection algorithm, in which the system starts is throughput priority mode (Perf_mode). Accordingly the Primary Schedule table 440 is loaded with the Throughput Priority table contents 410 and Secondary Schedule table 450 is loaded from the OS Priority table 420. Since the mode select bit indicating which selection algorithm is to be used will only change every Sub-Context Switch Interval (SCS_intrv), the same route will be used to update both schedule tables until the mode select bit value is updated using projection logic described above at the end of every Sub-Context Switch Interval (SCS_intrv). Each sub-context switch interval, the Priority Tables 410 and 420 are updated based on per thread counter (not shown) and accordingly Schedule Tables 440 and 450 are updated.

Figure 5:
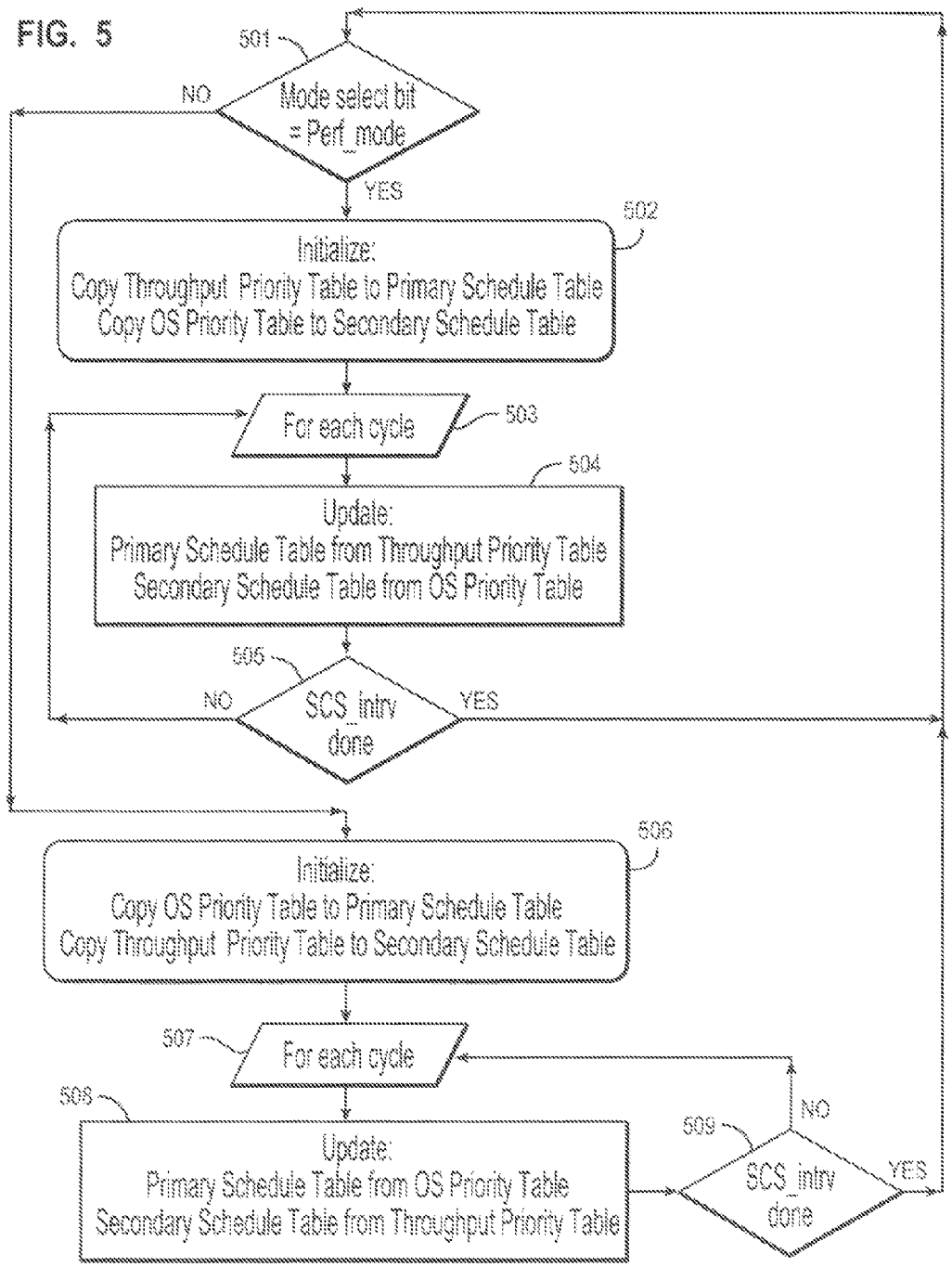
FIG. 5 shows a flowchart describing an exemplary thread selection & Scheduling process.

As mentioned above, thread selection logic could implement different methods. FIG. 5 shows a flowchart describing an exemplary thread selection & Scheduling process. In this method, Primary Schedule Table 440 is examined ascending from the highest priority to the lowest priority to assign the M available fetch operation slots. If the number of threads at a given thread priority level exceeds M we use the Secondary Schedule Table to sort them according to their secondary priorities. Specifically, as shown in FIG. 5 the method starts at step 501, with the determination whether the present selection algorithm is the throughput priority mode. If it is, the method proceeds to step 502, at which the contents of the throughput priority table 410 are copied to the primary schedule table 440 and the contents of the OS priority table 420 are copied to the secondary schedule table 450. Per step 503, for each fetch operation in the present sub-context interval, the primary schedule table 440 is updated from the throughput priority table 410 and the secondary schedule table 450 is updated from the OS priority table 420 at step 504 respectively. At step 505 it is determined whether end of the present sub-context interval has been reached. If the end of the present sub-context interval has been reached the method loops back to step 501, and if not the method loops back to step 503 for the next cycle.

If at step 501 it is determined that the present selection algorithm is not the throughput priority mode, the method proceeds to step 506 at which the contents of the OS priority table 420 are copied to the primary schedule table 440 and the contents of the throughput priority table 410 are copied to the secondary schedule table 450. Per step 507, for each fetch operation in the present sub-context interval, the primary schedule table 440 is updated from the throughput priority table 410 and the secondary schedule table 450 is updated from the OS priority table 420 at step 508. At step 509 it is determined whether end of the present sub-context interval has been reached. If the end of the present sub-context interval has been reached the method loops back to step 501, and if not the method loops back to step 507 for the next fetch operation in the sub-context interval.

Figure 6:
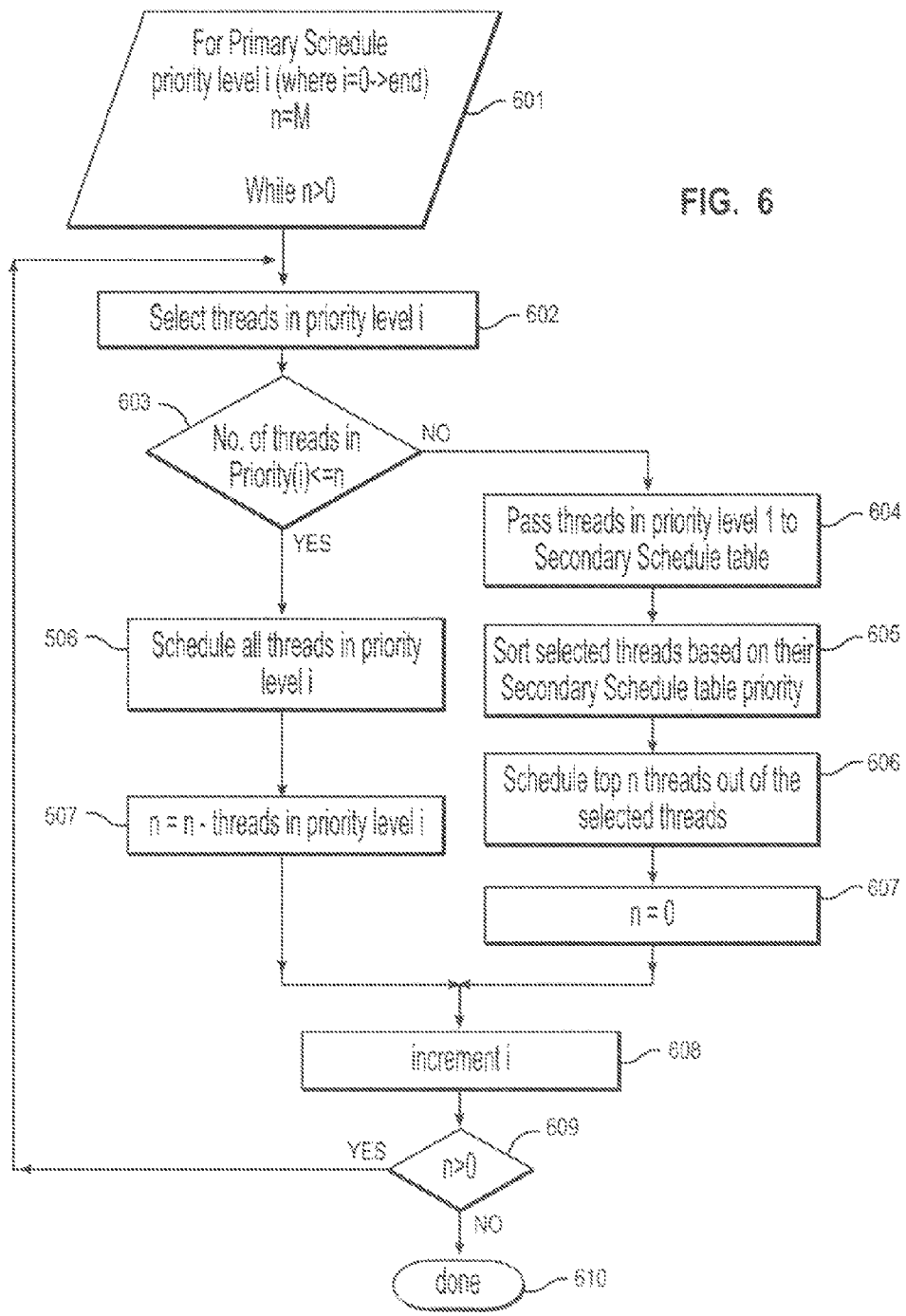
FIG. 6 shows a flowchart for the thread selection mechanism referred to as Hierarchical priority.

FIG. 6 a flowchart for the thread selection mechanism referred to as hierarchical priority. In this method, the Primary Schedule Table is examined in descending order from the highest priority to the lowest priority to fill in the M thread fetch slots. If the threads in a thread priority level exceed M, the Secondary Schedule Table is used to sort them according to their secondary priorities. Specifically, the method starts at step 601 at which an initial priority level i value of 0 is set, and a value n, which reflects the number of fetch operations remaining to be executed in the present cycle, is initialised at a value equal to M, the number of fetch operations that may be executed in a given cycle. The method proceeds to step 602, at which all threads in OS priority table 420 having a priority level equal to i are selected. At step 603 it is determined whether the number of threads selected at step 603 exceeds the present value of n, the number of fetch operations remaining to be executed in the present cycle. If the number of selected threads is less than the number of fetch operations remaining to be executed in the present cycle, the method proceeds to step 606, and otherwise proceeds to step 604. At step 606 all the selected threads are assigned fetch operation slots, and the method proceeds to step 607 at which n, the number of fetch operations remaining to be executed in the present cycle, is reduced by the number of selected threads. The method then proceeds to step 608 at which i is incremented by 1, before proceeding to step 609 at which it is determined whether the number of fetch operations remaining to be executed in the present cycle is greater than zero, that is, that fetch operations remain to be attributed. If it is determined that whether the number of fetch operations remaining to be executed in the present cycle is greater than zero, the method returns to step 602, or otherwise terminates at step 610. If at step 603 it is determined that the number of selected threads is not less than the number of fetch operations remaining to be executed in the present cycle, the method proceeds to step 604. At step 604 the selected threads are passed to the secondary schedule table 450, these threads then being sorted at step 605 based on their secondary schedule table priority. The method then proceeds to step 606, at which the top n threads from the secondary schedule table 450 are scheduled to fill all of the remaining fetch operation slots. The method accordingly sets n to zero at step 607 before reverting to step 608 as described above.

Figure 7:
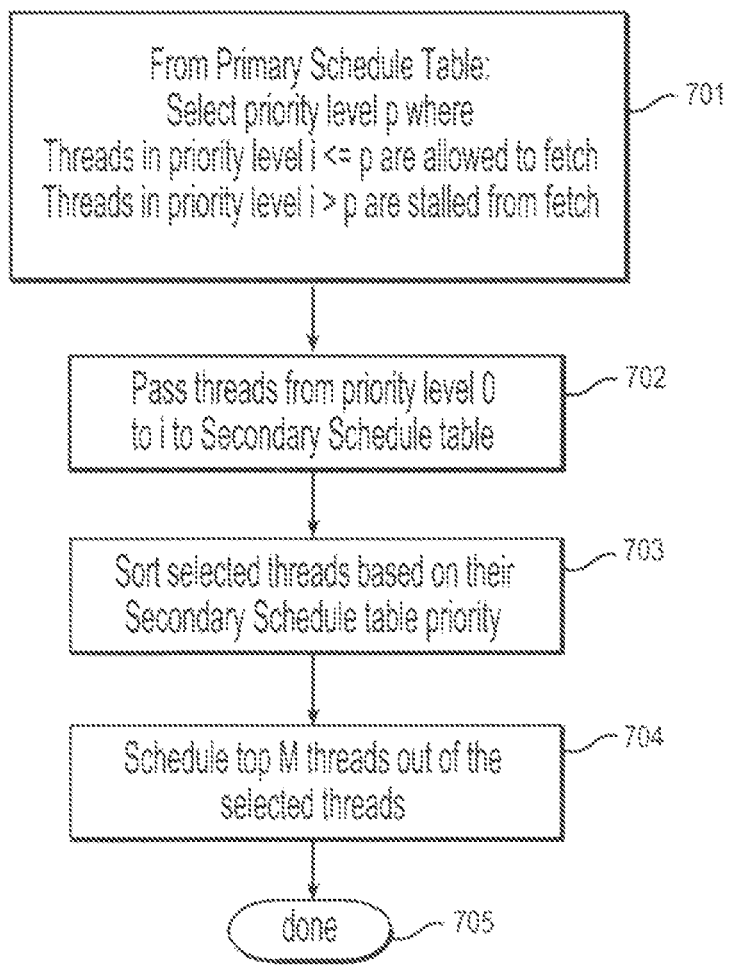
FIG. 7 shows a flowchart for the thread selection mechanism referred to as Stall priority.

FIG. 7 shows a flowchart for the thread selection mechanism referred to as Stall priority. In this method Primary Schedule Table is used to filter stalled threads from the not stalled threads. Only thread NOT stalled are passed to the Secondary Schedule to be sorted then scheduled for fetching. As shown in FIG. 7, the method starts at step 701, at which it is determined priority threshold is determined, whereby any threads having a priority level less than or equal to this threshold are potentially allowed to perform fetch operations, and any threads having a priority level greater than this threshold are considered to be stalled, and not permitted to carry out fetch operations. The method then proceeds to step 702, at which threads that are not stalled, i.e. are loaded into the secondary schedule table 450. The secondary schedule table sorts these threads as described above at step 703, whereupon the top M threads are scheduled at step 704.

According to aspects of the present invention software and hardware priorities are combined through a two-level priority technique. According to aspects of the present invention there is provided an approach of control sharing of fetch bandwidth. According to aspects of the present invention there is provided a technique of defining thread priority in SMT processors with a fine-grain sharing of processor resources with sharing of functional units and internal structures among the running threads. Furthermore, According to aspects of the present invention the fetching unit sharing among running threads is controlled for both real-time and non-real time applications. According to aspects of the present invention there is described an approach of sharing fetch bandwidth in SMT processors in which all core structures are shared among running threads. According to aspects of the present invention both Hardware and Software events are considered to control thread fetch bandwidth sharing, whereas certain prior art arrangements only storage events such as L1 Miss are considered to control switching between threads.

The invention can take the form of an entirely hardware embodiment, an entirely software embodiment or an embodiment containing both hardware and software elements. In particular it will be appreciated that while FIG. 4 is presented in the form of hardware, exactly equivalent effects could be achieved in software. In a preferred embodiment, the invention is implemented in software, which includes but is not limited to firmware, resident software, microcode, etc.

Furthermore, the invention can take the form of a computer program product accessible from a computer-usable or computer-readable storage medium providing program code for use by or in connection with a computer or any instruction execution system. For the purposes of this description, a computer-usable or computer-readable storage medium can be any apparatus that can store the program for use by or in connection with the instruction execution system, apparatus, or device. The computer-usable or computer-readable storage medium does not include a propagation medium, such as a signal or carrier wave.

The computer-usable or computer-readable storage medium can be an electronic, magnetic, optical, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method of scheduling fetch operations to a plurality of threads scheduled to run in a simultaneous multithreading processor, wherein a plurality of fetch operations is performed in a given fetch cycle in a plurality of fetch cycles within a given sub-context switch interval, the method comprising:
   determining a software/OS priority for each thread in the plurality of threads;
   dividing each context switch interval in a plurality of context switch intervals into a plurality of sub-context switch intervals of equal length, each sub-context switch interval having a same number of fetch cycles and each fetch cycle having a same number of fetch operations; and
   attributing a desired number of fetch operations to each thread in the plurality of threads per each sub-context switch interval based on the determined software/OS priority of each thread, wherein during each sub-context switch interval:
      assigning each of the plurality of fetch operations to each of the plurality of threads during each fetch cycle within a sub-context switch interval based on one of a thread software/OS priority sorting algorithm or a thread hardware performance priority sorting algorithm, wherein the thread software/OS priority sorting algorithm sorts the plurality of threads according their respective software/OS priority level, and wherein the thread software/OS priority sorting algorithm is a default sorting algorithm;
      calculating an error value based on a difference between the desired number of fetch operations attributed to each of the plurality of threads per each sub-context switch interval and an actual number of fetch operations performed by each of the plurality of threads per each sub-context switch interval;
      comparing the calculated error value with a predetermined error threshold value after a defined warm up period of a predetermined number of sub-context intervals has expired; and
      responsive to the calculated error value exceeding the predetermined error threshold value, switching to whichever of said two sorting algorithms that is not presently being used for a following sub-context switch interval, wherein during the defined warm up period of the predetermined number of sub-context intervals the thread software/OS priority sorting algorithm is used regardless of the calculated error value and no switching of said two sorting algorithms takes place.

2. The method of claim 1 wherein the calculating of the error value comprises:
   calculating an average number of fetch operations attributed to each of the plurality of threads per each sub-context switch interval;
   determining for each of the plurality of threads the difference between the desired number of fetch operations attributed to each of the plurality of threads per each sub-context switch interval and the average number of fetch operations attributed to each of the plurality of threads per each sub-context switch interval; and
   adding the difference between the desired number of fetch operations and the average number of fetch operations for all of the plurality of threads to arrive at the error value.

3. The method of claim 1 wherein the thread hardware performance priority sorting algorithm sorts the plurality of threads according to their respective hardware performance measurement.

4. The method of claim 1 wherein when whichever of said two sorting algorithms that is presently being used in a given sub-context switch interval gives equal priority to two threads, said other sorting algorithm is used as a priority tie breaker.

5. The method of claim 1 wherein whichever of said two sorting algorithms is used solely to select threads that are not currently stalled, said other sorting algorithm is used to complete the assigning of each of the plurality of fetch operations to one or more of the plurality of threads.

6. A computer program product stored on a computer-readable storage medium having instructions encoded thereon that are executable by a computer device for scheduling fetch operations to a plurality of threads scheduled to run in a simultaneous multithreading processor, wherein a plurality of fetch operations is performed in a given fetch cycle in a plurality of fetch cycles within a given sub-context switch interval, the computer program product comprising:

instructions for determining a software/OS priority for each thread in the plurality of threads;

instructions for dividing each context switch interval in a plurality of context switch intervals into a plurality of sub-context switch intervals of equal length, each sub-context switch interval having a same number of fetch cycles and each fetch cycle having a same number of fetch operations; and instructions for attributing a desired number of fetch operations to each thread in the plurality of threads per each sub-context switch interval based on the determined software/OS priority of each thread, wherein during each sub-context switch interval:

instructions for assigning each of the plurality of fetch operations to each of the plurality of threads during each fetch cycle within a sub-context switch interval based on one of a thread software/OS priority sorting algorithm or a thread hardware performance priority sorting algorithm, wherein the thread software/OS priority sorting algorithm sorts the plurality of threads according their respective software/OS priority level, and wherein the thread software/OS priority sorting algorithm is a default sorting algorithm;

instructions for calculating an error value based on a difference between the desired number of fetch operations attributed to each of the plurality of threads per each sub-context switch interval and an actual number of fetch operations performed by each of the plurality of threads per each sub-context switch interval;

instructions for comparing the calculated error value with a predetermined error threshold value after a defined warm up period of a predetermined number of sub-context intervals has expired; and instructions, responsive to the calculated error value exceeding the predetermined error threshold value, for switching to whichever of said two sorting algorithms that is not presently being used for a following sub-context switch interval, wherein during the defined warm up period of the predetermined number of sub-context intervals the thread software/OS priority sorting algorithm is used regardless of the calculated error value and no switching of said two sorting algorithms takes place.

7. A data processing system for scheduling fetch operations to a plurality of threads scheduled to run in a simultaneous multithreading processor, wherein a plurality of fetch operations is performed in a given fetch cycle in a plurality of fetch cycles within a given sub-context switch interval, the data processing system comprising:

a bus;

a storage device connected to the bus, wherein the storage device stores instructions; and a processor connected to the bus, wherein the processor executes the instructions to:

determine a software/OS priority for each thread in the plurality of threads;

divide each context switch interval in a plurality of context switch intervals into a plurality of sub-context switch intervals of equal length, each sub-context switch interval having a same number of fetch cycles and each fetch cycle having a same number of fetch operations; and attribute a desired number of fetch operations to each thread in the plurality of threads per each sub-context switch interval based on the determined software/OS priority of each thread, wherein during each sub-context switch interval the processor executes the instructions to:

assign each of the plurality of fetch operations to each of the plurality of threads during each fetch cycle within a sub-context switch interval based on one of a thread software/OS priority sorting algorithm or a thread hardware performance priority sorting algorithm, wherein the thread software/OS priority sorting algorithm sorts the plurality of threads according their respective software/OS priority level, and wherein the thread software/OS priority sorting algorithm is a default sorting algorithm;

calculate an error value based on a difference between the desired number of fetch operations attributed to each of the plurality of threads per each sub-context switch interval and an actual number of fetch operations performed by each of the plurality of threads per each sub-context switch interval;

compare the calculated error value with a predetermined error threshold value after a defined warm up period of a predetermined number of sub-context intervals has expired; and switch to whichever of said two sorting algorithms that is not presently being used for a following sub-context switch interval in response to the calculated error value exceeding the predetermined error threshold value, wherein during the defined warm up period of the predetermined number of sub-context intervals the thread software/OS priority sorting algorithm is used regardless of the calculated error value and no switching of said two sorting algorithms takes place.

8. The data processing system of claim 7 wherein calculating the error value comprises the processor executing the instructions to:

calculate an average number of fetch operations attributed to each of the plurality of threads per each sub-context switch interval;

determine for each of the plurality of threads the difference between the desired number of fetch operations attributed to each of the plurality of threads per each sub-context switch interval and the average number of fetch operations attributed to each of the plurality of threads per each sub-context switch interval; and add the difference between the desired number of fetch operations and the average number of fetch operations for all of the plurality of threads to arrive at the error value.

9. The data processing system of claim 7 wherein the thread hardware performance priority sorting algorithm sorts the plurality of threads according to their respective hardware performance measurement.

10. The data processing system of claim 7 wherein when whichever of said two sorting algorithms that is presently being used in a given sub-context switch interval gives equal priority to two threads, said other sorting algorithm is used as a priority tie breaker.

11. The data processing system of claim 7 wherein whichever of said two sorting algorithms is used solely to select threads that are not currently stalled, said other sorting algorithm is used to complete the assigning of each of the plurality of fetch operations to one or more of the plurality of threads.

12. The computer program product of claim 6 wherein the instructions for calculating the error value comprises:
- instructions for calculating an average number of fetch operations attributed to each of the plurality of threads per each sub-context switch interval;
- instructions for determining for each of the plurality of threads the difference between the desired number of fetch operations attributed to each of the plurality of threads per each sub-context switch interval and the average number of fetch operations attributed to each of the plurality of threads per each sub-context switch interval; and
- instructions for adding the difference between the desired number of fetch operations and the average number of fetch operations for all of the plurality of threads to arrive at the error value.

13. The computer program product of claim 6 wherein the thread hardware performance priority sorting algorithm sorts the plurality of threads according to their respective hardware performance measurement.

14. The computer program product of claim 6 wherein when whichever of said two sorting algorithms that is presently being used in a given sub-context switch interval gives equal priority to two threads, said other sorting algorithm is used as a priority tie breaker.

15. The computer program product of claim 6 wherein whichever of said two sorting algorithms is used solely to select threads that are not currently stalled, said other sorting algorithm is used to complete the assigning of each of the plurality of fetch operations to one or more of the plurality of threads.

* * * * *